(12) United States Patent
Abiko et al.

(10) Patent No.: US 9,998,069 B2
(45) Date of Patent: Jun. 12, 2018

(54) PHOTOVOLTAIC SYSTEM AND PANEL CLEANING METHOD

(71) Applicant: Sumitomo Electric Industries, Ltd., Osaka (JP)

(72) Inventors: Yoshiya Abiko, Osaka (JP); Youichi Nagai, Osaka (JP); Takashi Iwasaki, Osaka (JP); Rui Mikami, Osaka (JP); Kazumasa Toya, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days. days.

(21) Appl. No.: 14/831,631

(22) Filed: Aug. 20, 2015

(65) Prior Publication Data

US 2016/0056755 A1 Feb. 25, 2016

(30) Foreign Application Priority Data

Aug. 25, 2014 (JP) .................................. 2014-170652

(51) Int. Cl.
*H02S 40/10* (2014.01)
*H02S 20/30* (2014.01)
*F24J 2/46* (2006.01)

(52) U.S. Cl.
CPC .............. *H02S 40/10* (2014.12); *F24J 2/461* (2013.01); *H02S 20/30* (2014.12); *Y02E 10/40* (2013.01); *Y02E 10/52* (2013.01)

(58) Field of Classification Search
None
See application file for complete search history.

(56) References Cited

U.S. PATENT DOCUMENTS

| 2009/0266353 | A1* | 10/2009 | Lee ..................... B08B 1/008 126/593 |
| 2011/0137458 | A1* | 6/2011 | Hisatani ................ B08B 1/00 700/248 |
| 2013/0086761 | A1* | 4/2013 | Singh ................... B08B 1/008 15/77 |
| 2014/0041138 | A1* | 2/2014 | Adler ................... H01L 31/02 15/102 |

(Continued)

FOREIGN PATENT DOCUMENTS

| JP | 2008-021683 A | 1/2008 |
| JP | 2010-539724 A | 12/2010 |

(Continued)

*Primary Examiner* — Susan D Leong
(74) *Attorney, Agent, or Firm* — Venable LLP; Michael A. Sartori; Laura G. Remus

(57) ABSTRACT

This photovoltaic system includes: a support portion; a photovoltaic panel supported by the support portion so as to be able to take an orientation at any angle in each of azimuth and elevation; a drive device configured to change the orientation of the photovoltaic panel; and a control device configured to cause, during power generation, the drive device to drive the photovoltaic panel such that sun light hits the photovoltaic panel, the control device configured to, when executing a cleaning mode, control the drive device such that the photovoltaic panel takes an orientation that facilitates removal of attached substance to a light receiving surface of the photovoltaic panel by use of at least one of natural phenomena including rain, wind, dew condensation, and gravity.

15 Claims, 11 Drawing Sheets

(56) References Cited

U.S. PATENT DOCUMENTS

| | | | | |
|---|---|---|---|---|
| 2014/0283894 A1* | 9/2014 | Silver | ............... | F24J 2/525 |
| | | | | 136/246 |
| 2015/0047688 A1* | 2/2015 | Gharib | ............... | B08B 7/02 |
| | | | | 136/244 |
| 2015/0082924 A1* | 3/2015 | Morgan | ............ | F16B 7/0493 |
| | | | | 74/89.14 |
| 2015/0303864 A1* | 10/2015 | Gonzalez Moreno | ... | F24J 2/542 |
| | | | | 136/246 |

FOREIGN PATENT DOCUMENTS

| | | | |
|---|---|---|---|
| JP | 2011-146442 A | 7/2011 | |
| JP | 2011-249667 A | 12/2011 | |
| JP | 2012-124303 A | 6/2012 | |
| JP | 2013-153078 A | 8/2013 | |
| JP | 2014-007272 A | 1/2014 | |
| WO | 2009/044982 A1 | 4/2009 | |
| WO | WO2014072280 | * 5/2014 | ............ F24J 2/54 |

\* cited by examiner

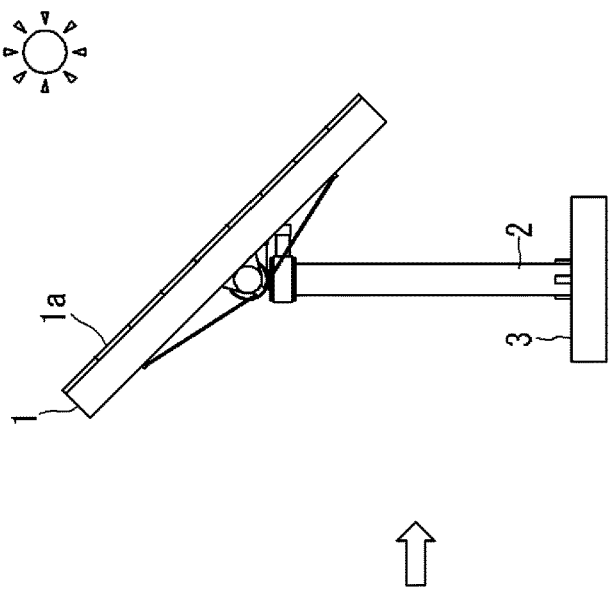
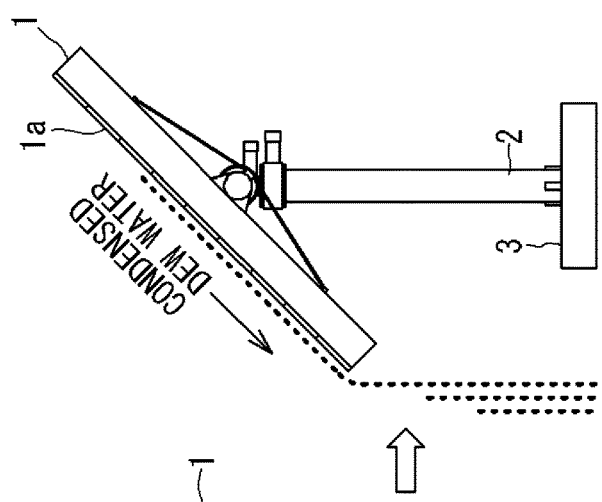
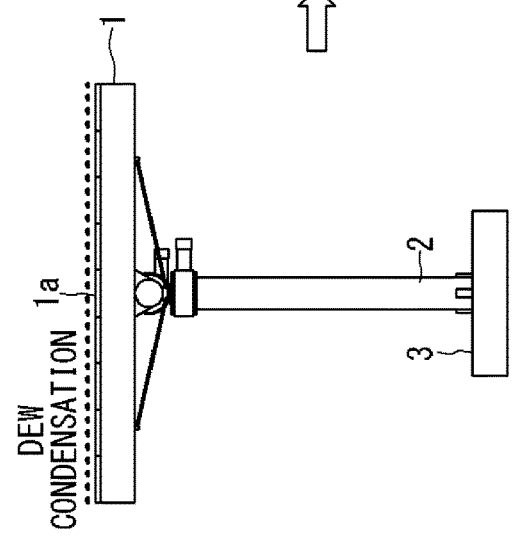

PHOTOVOLTAIC SYSTEM AND PANEL CLEANING METHOD

TECHNICAL FIELD

The present invention relates to a photovoltaic system, and in particular, relates to cleaning of the light receiving surface of a photovoltaic panel.

BACKGROUND ART

Photovoltaic panels are exposed to natural environments, and thus, their surfaces (light receiving surfaces) get dirty. Dirt leads to reduced power generation efficiency. In particular, with respect to a photovoltaic apparatus of a concentrator type which tracks the sun, there are cases where its power generation efficiency is greatly (about 20%, for example) reduced when the surface thereof gets dirty. For example, with respect to a photovoltaic apparatus installed in a desert district, when dust has accumulated on the surface thereof and become sticky due to dew condensation, such dust will not easily come off, which results in reduced power generation efficiency.

Thus, there has been proposed a photovoltaic apparatus provided with a surface cleaning function (for example, see FIG. 2 of PATENT LITERATURE 1, and FIG. 1 and FIG. 2 of PATENT LITERATURE 2).

Each prior art above has a configuration in which the cleaning is performed by a brush moving on the surface.

CITATION LIST

Patent Literature

PATENT LITERATURE 1: Japanese Laid-Open Patent Publication No. 2011-249667
PATENT LITERATURE 2: Japanese Laid-Open Patent Publication No. 2012-124303

SUMMARY OF INVENTION

Technical Problem

However, if a brush and a cleaning device for driving the brush are to be mounted for the entire photovoltaic panel, the structure becomes complicated and costs are increased. In addition, failures tend to occur, and thus, maintenance has to be performed often.

In view of such problems in the conventional art, the present invention is to provide a photovoltaic system and a panel cleaning method which realize a cleaning function in a simple manner, without providing a complicated cleaning device.

Solution to Problem

A photovoltaic system of the present invention includes: a support portion; a photovoltaic panel supported by the support portion so as to be able to take an orientation at any angle in each of azimuth and elevation; a drive device configured to change the orientation of the photovoltaic panel; and a control device configured to cause, during power generation, the drive device to drive the photovoltaic panel such that sun light hits the photovoltaic panel, the control device configured to, when executing a cleaning mode, control the drive device such that the photovoltaic panel takes an orientation that facilitates removal of attached substance to a light receiving surface of the photovoltaic panel by use of at least one of natural phenomena including rain, wind, dew condensation, and gravity.

A panel cleaning method of the present invention is a panel cleaning method for a photovoltaic apparatus, the photovoltaic apparatus including: a support portion; a photovoltaic panel supported by the support portion so as to be able to take an orientation at any angle in each of azimuth and elevation; and a drive device configured to change the orientation of the photovoltaic panel, the panel cleaning method including: when executing a cleaning mode, controlling the drive device to cause the photovoltaic panel to take an orientation that facilitates removal of attached substance to a light receiving surface of the photovoltaic panel by use of at least one of natural phenomena including rain, wind, dew condensation, and gravity.

Advantageous Effects of Invention

According to the present invention, without providing a complicated cleaning device, it is possible to provide a photovoltaic system and a panel cleaning method that realize a cleaning function in a simple manner.

BRIEF DESCRIPTION OF DRAWINGS

FIG. 7A, FIG. 7B and FIG. 7C show pattern 3 of the cleaning mode which uses dew condensation and gravity as the natural phenomena.

DESCRIPTION OF EMBODIMENTS

Figure 1:
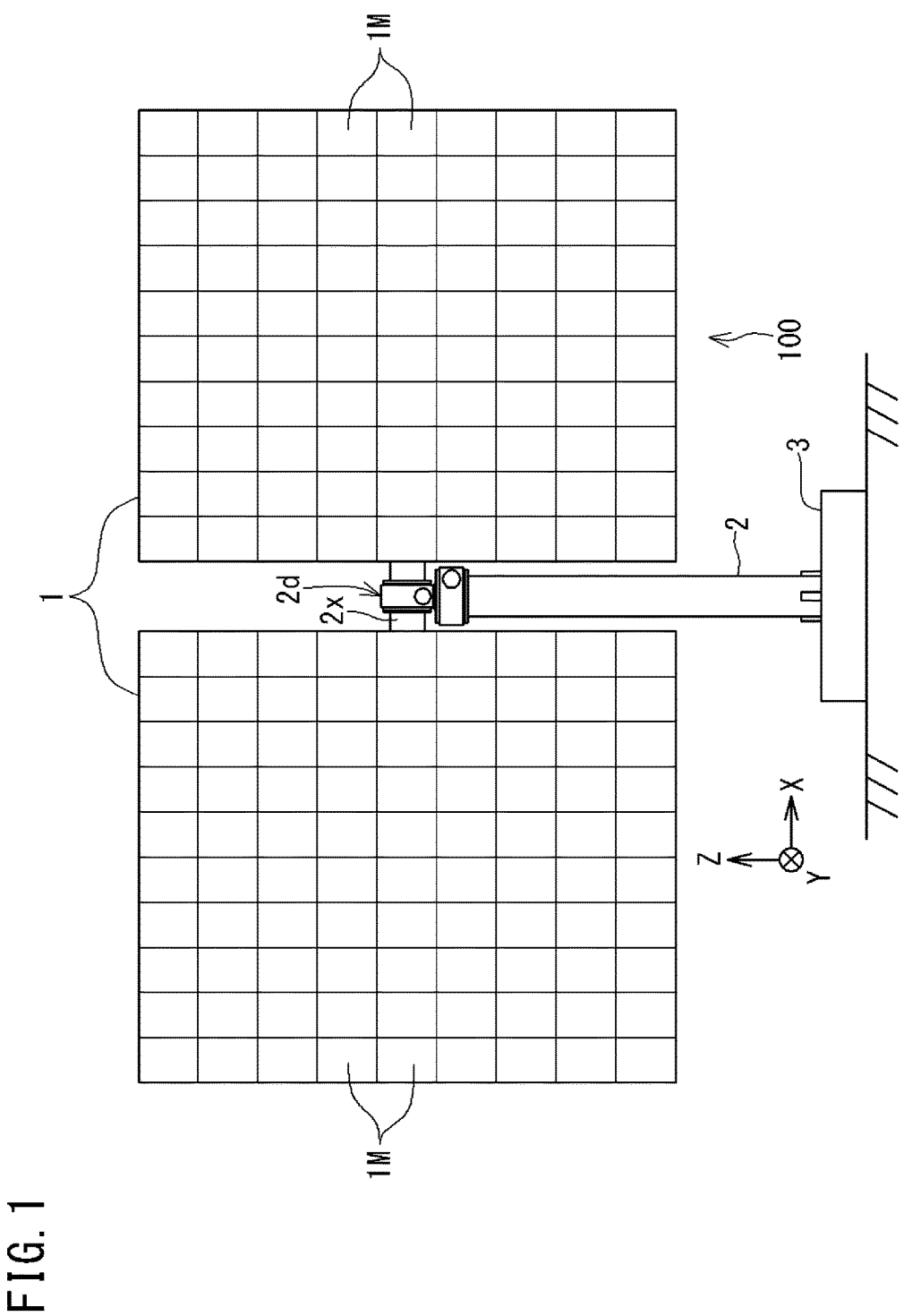
FIG. 1 is a front view of one unit of a photovoltaic apparatus of a concentrator type.

[Summary of Embodiment]
Summary of the embodiments of the present invention includes at least the following.

(1) This photovoltaic system includes: a support portion; a photovoltaic panel supported by the support portion so as to be able to take an orientation at any angle in each of azimuth and elevation; a drive device configured to change the orientation of the photovoltaic panel; and a control device configured to cause, during power generation, the drive device to drive the photovoltaic panel such that sun light hits the photovoltaic panel, the control device configured to, when executing a cleaning mode, control the drive device such that the photovoltaic panel takes an orientation that facilitates removal of attached substance to a light receiving surface of the photovoltaic panel by use of at least one of natural phenomena including rain, wind, dew condensation, and gravity.

In the photovoltaic system as in (1) above, when executing the cleaning mode, the control device causes the drive device to operate such that the photovoltaic panel takes an orientation that facilitates removal of attached substance to the light receiving surface thereof by use of natural phenomena. Therefore, it is possible to perform cleaning of the light receiving surface by use of natural phenomena such as rain, wind, dew condensation, and gravity, for example.

(2) In the photovoltaic system according to (1), the control device may obtain weather information regarding at least rain and wind from an external information source, make a schedule of the cleaning mode, and control the drive device based on the schedule.

In this case, by obtaining highly reliable weather information from the external information source, it is possible to execute the cleaning mode systematically. In addition, it is not necessary to provide a sensor or the like for rain and wind on the photovoltaic panel side.

(3) The photovoltaic system according to (1) may further include a rainfall sensor and a wind direction and speed sensor, and the control device may control the drive device based on sensor outputs from the rainfall sensor and the wind direction and speed sensor.

In this case, it is possible to execute the cleaning mode as appropriate in accordance with the weather condition of the site where the photovoltaic panel is installed.

(4) In the photovoltaic system according to any one of (1) to (3), for example, in the cleaning mode, the photovoltaic panel may take an orientation that allows wind to hit the light receiving surface which faces obliquely downward.

In this case, by causing the light receiving surface to face obliquely downward, it is possible to promote free fall of substance such as dust attached to the light receiving surface, and further, it is possible to forcedly drop dust and the like by the wind hitting the light receiving surface.

(5) In the photovoltaic system according to any one of (1) to (3), for example, in the cleaning mode, the photovoltaic panel may take an orientation that allows rain and wind to hit the light receiving surface which faces obliquely upward.

In this case, substance such as dust attached to the light receiving surface is washed off by the rainfall onto the light receiving surface which has been caused to face obliquely upward, and further, the washing-off effect can be enhanced by the wind.

(6) In the photovoltaic system according to any one of (1) to (3), for example, in the cleaning mode, the light receiving surface may be kept horizontal while facing directly above from nighttime to dawn, and then, the light receiving surface may be caused to stand, to drop condensed dew water.

In this case, by causing the light receiving surface to stand, the condensed dew water accumulated on the light receiving surface which faces directly above can be washed off together with substance such as dust attached to the light receiving surface.

(7) In the photovoltaic system according to any one of (1) to (6), preferably, the light receiving surface has a hydrophilic or water-repellent layer formed thereon.

In this case, it is possible to promote removal of the attached substance in the cleaning mode.

(8) In the photovoltaic system according to any one of (1) to (7), a vibration device configured to cause the photovoltaic panel to micro-vibrate in the cleaning mode may be provided.

In this case, by the vibration device causing the photovoltaic panel to micro-vibrate, it is possible to promote removal of the attached substance in the cleaning mode.

(9) From the viewpoint of a panel cleaning method, the present invention is a panel cleaning method for a photovoltaic apparatus, the photovoltaic apparatus including: a support portion; a photovoltaic panel supported by the support portion so as to be able to take an orientation at any angle in each of azimuth and elevation; and a drive device configured to change the orientation of the photovoltaic panel, the panel cleaning method including: when executing a cleaning mode, controlling the drive device to cause the photovoltaic panel to take an orientation that facilitates removal of attached substance to a light receiving surface of the photovoltaic panel by use of at least one of natural phenomena including rain, wind, dew condensation, and gravity.

According to the cleaning method of (9) above, when executing the cleaning mode, the photovoltaic panel takes an orientation that facilitates removal of attached substance to the light receiving surface thereof by use of natural phenomena. Therefore, it is possible to perform cleaning of the light receiving surface by use of natural phenomena such as rain, wind, dew condensation, and gravity, for example.

[Detail of Embodiment]

Hereinafter, an embodiment of the present invention will be described with reference to the drawings.

<<Photovoltaic Apparatus>>

Figure 2:
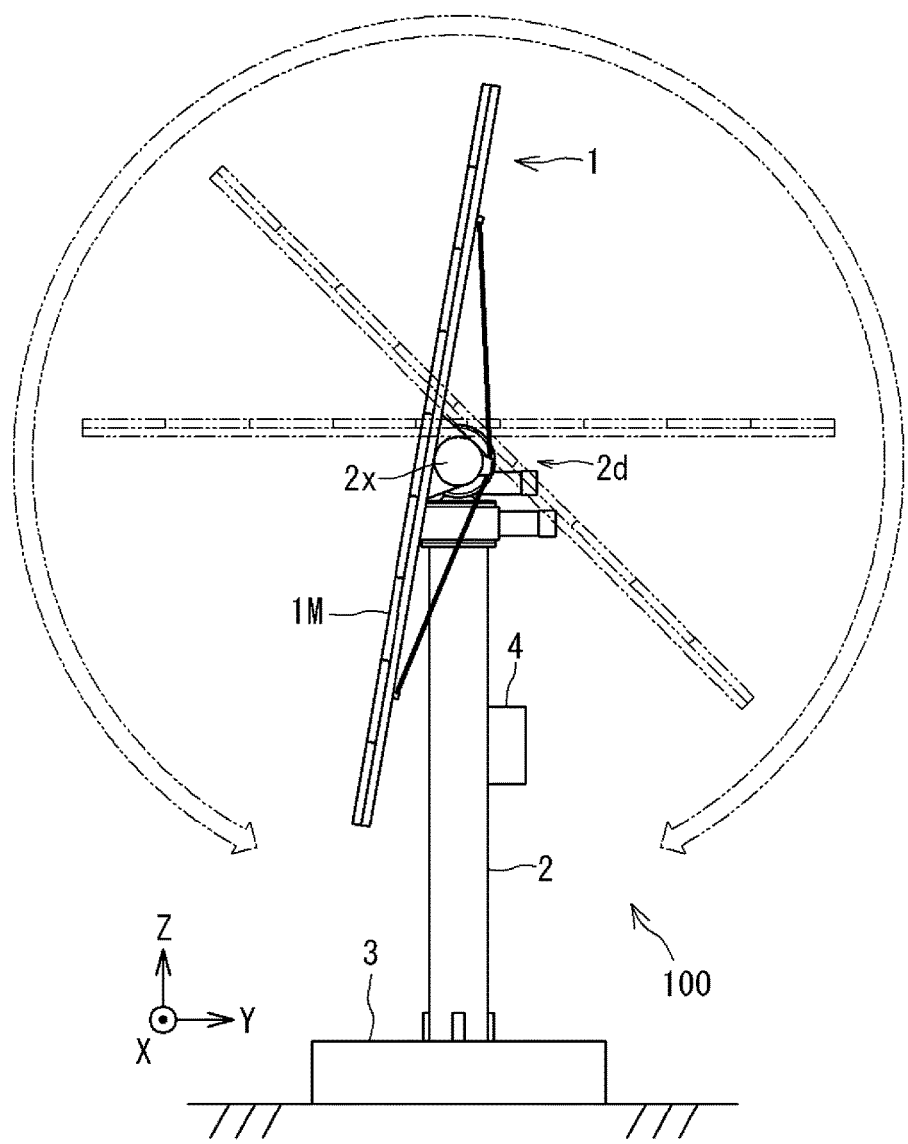
FIG. 2 is a side view of one unit of the photovoltaic apparatus of a concentrator type.

FIG. 1 and FIG. 2 are a front view and a side view of one unit of a photovoltaic apparatus of a concentrator type, respectively. In FIG. 1, a photovoltaic apparatus 100 includes: a photovoltaic panel 1 composed of two-winged panels on the left and the right; a support portion 2 therefor; and a base 3 which vertically fixes the support portion 2 to the ground. The base 3 is fixed to the ground. A two-axis drive 2d is provided at the support point for the photovoltaic panel 1, on the upper end of the support portion 2. The two-axis drive 2d enables the photovoltaic panel 1 to rotate in the elevation direction about an axis 2x which is parallel to the X-axis in the drawings, and to rotate in the azimuth direction about the support portion 2 which is parallel to the Z-axis. It should be noted that a "support portion" in a broader meaning includes not only the support portion 2 but also the two-axis drive 2d and the base 3.

As a rotation range, with respect to the elevation direction about the axis 2x, 180-degree rotation is allowed in both directions (i.e., 360 degrees): that is, from a horizontal orientation (0 degrees) in which the photovoltaic panel 1 faces directly above (zenith) in the Z direction, through a vertical orientation (90 degrees), to a horizontal orientation (180 degrees) in which the photovoltaic panel 1 faces directly below in the Z direction, and vice versa. Rotation about the support portion 2 is also allowed in 360 degrees. The 360-degree rotation is allowed because the support portion 2 and the two-axis drive 2d are provided in the gap between the two-winged panels so as not to hinder the rotation. In this manner, the photovoltaic panel 1 is supported by the support portion 2 so as to be able to take an orientation at any angle in each of the azimuth and the elevation.

FIG. 2 shows one example of the manner of the rotation in the elevation direction. The support portion 2 is provided with a drive device 4. The drive device 4 includes a drive circuit for driving built-in motors for the two-axis drive 2d. Operations of the motors (stepping motors) for the respective axes enable the photovoltaic panel 1 to take an orientation at any angles in the azimuth and the elevation.

With reference back to FIG. 1, each wing of the photovoltaic panel 1 includes photovoltaic modules 1M arranged by 9 in length×10 in breadth in a matrix shape, for example. Therefore, a total of 180 photovoltaic modules 1M exist in the photovoltaic panel 1 composed of the two wings.

<<Photovoltaic Module>>

Figure 3:
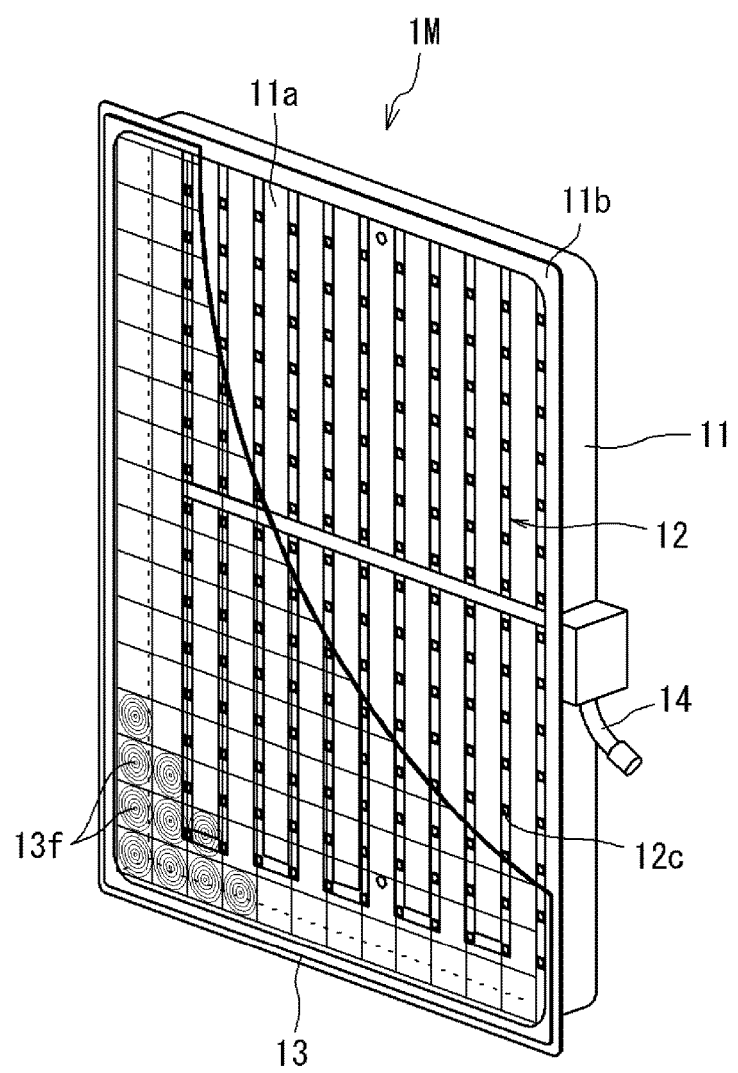
FIG. 3 is a perspective view (partially cut out) showing an enlarged view of one example of a photovoltaic module of a concentrator type.

FIG. 3 is a perspective view (partially cut out) showing an enlarged view of one example of a photovoltaic module of a concentrator type (hereinafter, also simply referred to as module) 1M. With reference to FIG. 3, the module 1M includes, as main components, a housing 11 formed in a vat shape and having a flat bottom surface 11a; a flexible printed circuit 12 arranged in a plurality of rows so as to be in contact with the bottom surface 11a; a concentrating portion 13 mounted, like a cover, to a flange portion 11b of the housing 11. The housing 11 is made of metal.

The flexible printed circuit 12 is formed by providing a conductor layer which forms a circuit pattern, on an insulating base material of a strip film shape, and by mounting cells 12c and other electronic components on the conductor layer. As each cell 12c, a solar cell having heat-resistance and high power generation efficiency is used.

The concentrating portion 13 is a Fresnel lens array and is formed by arranging, in a matrix shape, a plurality of (for example, 16 in length×12 in breadth, 192 in total) Fresnel lenses 13f which each concentrates sun light. The concentrating portion 13 can be obtained by, for example, forming a silicone resin film on a back surface (inside) of a glass plate used as a base material. Each Fresnel lens 13f is formed on this resin film. The total number and arrangement of the Fresnel lenses 13f are the same as the total number and arrangement of the cells 12c, and the Fresnel lenses 13f and the cells 12c are in one-to-one correspondence with each other such that their optical axes are aligned with each other. A connector 14 for taking out the output from the module 1M is provided on the external surface of the housing 11.

Figure 4:
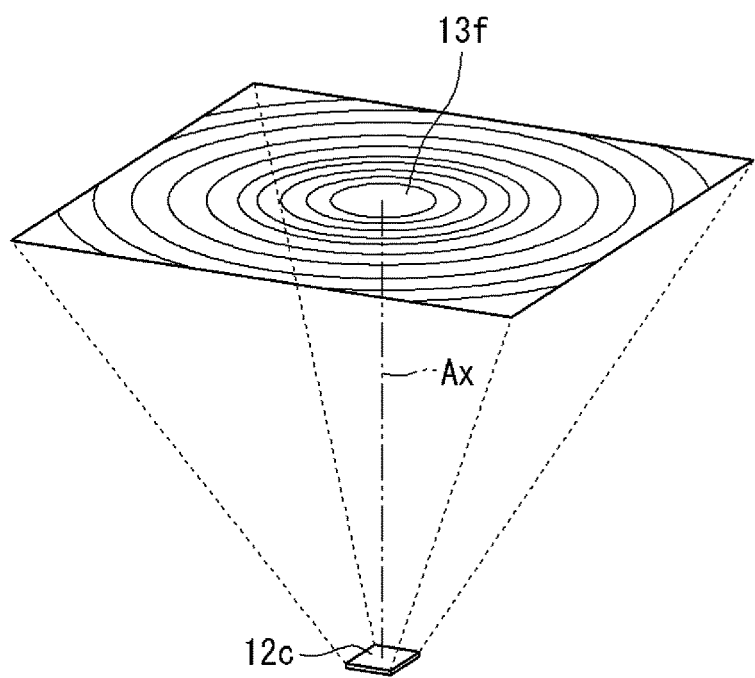
FIG. 4 is a perspective view showing optical relationship between one Fresnel lens and one cell.

FIG. 4 is a perspective view showing optical relationship between one Fresnel lens 13f and one cell 12c. An optical axis Ax of the Fresnel lens 13f crosses the center of the cell 12c. When sun light is incident on the Fresnel lens 13f at an incident angle of 0 degrees, light that has been converged by the Fresnel lens 13f is concentrated on the cell 12c, whereby the cell 12c generates power. During daytime, if the photovoltaic panel 1 (FIG. 1) accurately tracks the sun, such optical relationship is always realized and power generation is efficiently performed.

<<Cleaning Mode>>

Next, a cleaning mode which is executed separately from power generation will be described. When the cleaning mode is to be executed, the drive device 4 causes the photovoltaic panel 1 to take an orientation that facilitates removal of attached substance to the light receiving surface by use of natural phenomena. The drive device 4 is controlled by a control device, which will be described later. The natural phenomena mainly mean rain, wind, dew condensation, and gravity.

The cleaning mode is basically executed during nighttime when power generation is not performed. However, even during daytime, for example, when clouds are thick and thus sufficient power generation cannot be performed, and when it is raining or wind of a predetermined strength or greater is blowing, the cleaning mode may be executed.

<<Pattern 1 of Cleaning Mode>>

Figure 5:
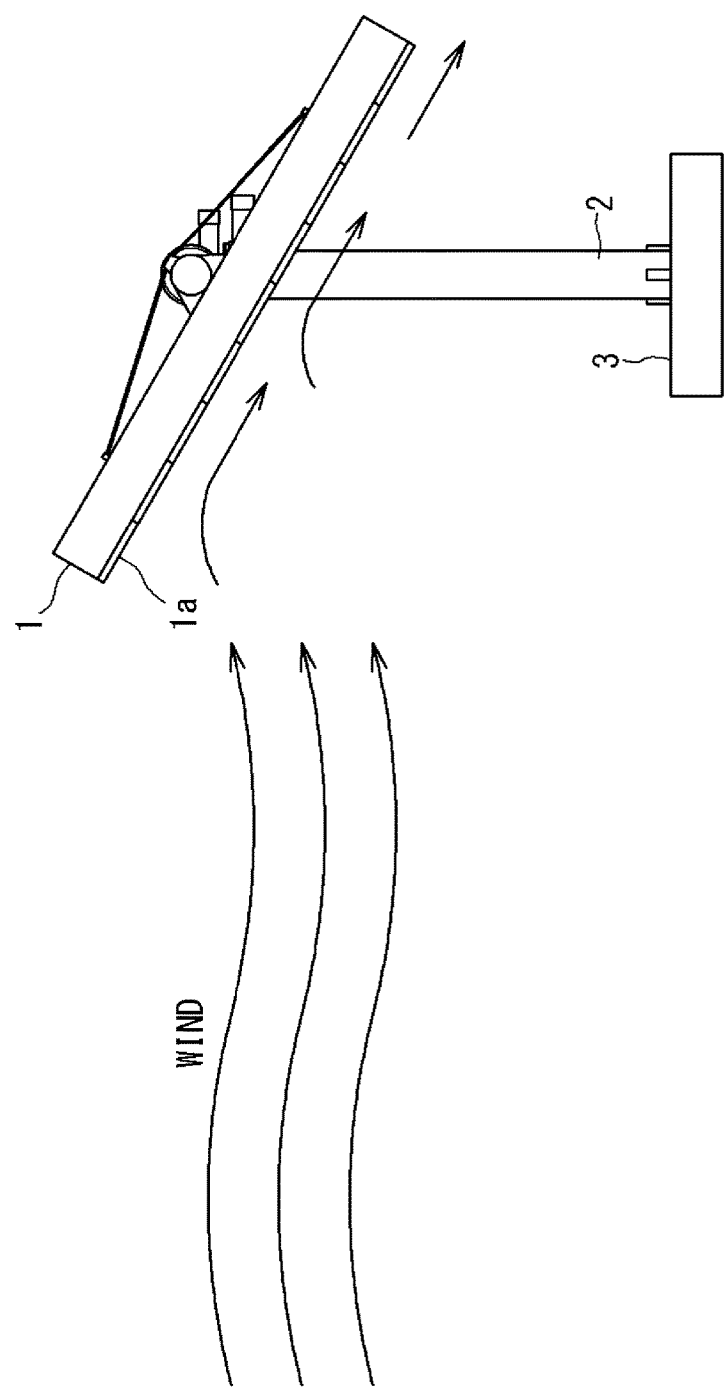
FIG. 5 shows pattern 1 of a cleaning mode which uses gravity and wind as natural phenomena.

FIG. 5 shows pattern 1 of the cleaning mode which uses gravity and wind as the natural phenomena. In this case, a light receiving surface 1a of the photovoltaic panel 1 faces obliquely downward. In addition, the light receiving surface 1a faces not merely obliquely downward but faces obliquely downward such that wind (side wind) hits the light receiving surface 1a. By causing the light receiving surface 1a to face obliquely downward, it is possible to promote free fall of attached substance such as dust that has accumulated on the light receiving surface 1a. In addition, since the wind hits the light receiving surface 1a and flows as indicated by the arrow in FIG. 5 along the light receiving surface 1 a, it is possible to forcedly drop dust and the like attached to the light receiving surface 1a.

For the photovoltaic panel 1 that has been installed in a region, such as desert, that has little rain but great clouds of dust, execution of such a cleaning mode is effective. In this case, wind needs to have a predetermined wind speed, and information of the direction/time in which the wind blows is required. It should be noted that the angle range of the "obliquely downward" is a range between a state where the light receiving surface 1a is horizontal while facing directly below (180 degrees), and a state where the light receiving surface 1a stands vertically (90 degrees). The closer to horizontal the light receiving surface 1 a is, the more easily free fall of dust and the like is caused. However, in such a case, the light receiving surface 1a is less likely to receive wind pressure, and thus, the effect of removing (clearing) dust and the like is reduced. On the contrary, the closer to vertical the light receiving surface 1a is, the stronger wind pressure the light receiving surface 1a receives. However, in such a case, the wind is less likely to flow along the light receiving surface 1a, and thus, the effect of removing dust and the like is reduced.

As a pattern similar to that in FIG. 5, it is also possible to cause the light receiving surface 1a to stand substantially vertically in such a manner as to receive wind from a direction oblique to the light receiving surface 1a.

<<Pattern 2 of Cleaning Mode>>

Figure 6:
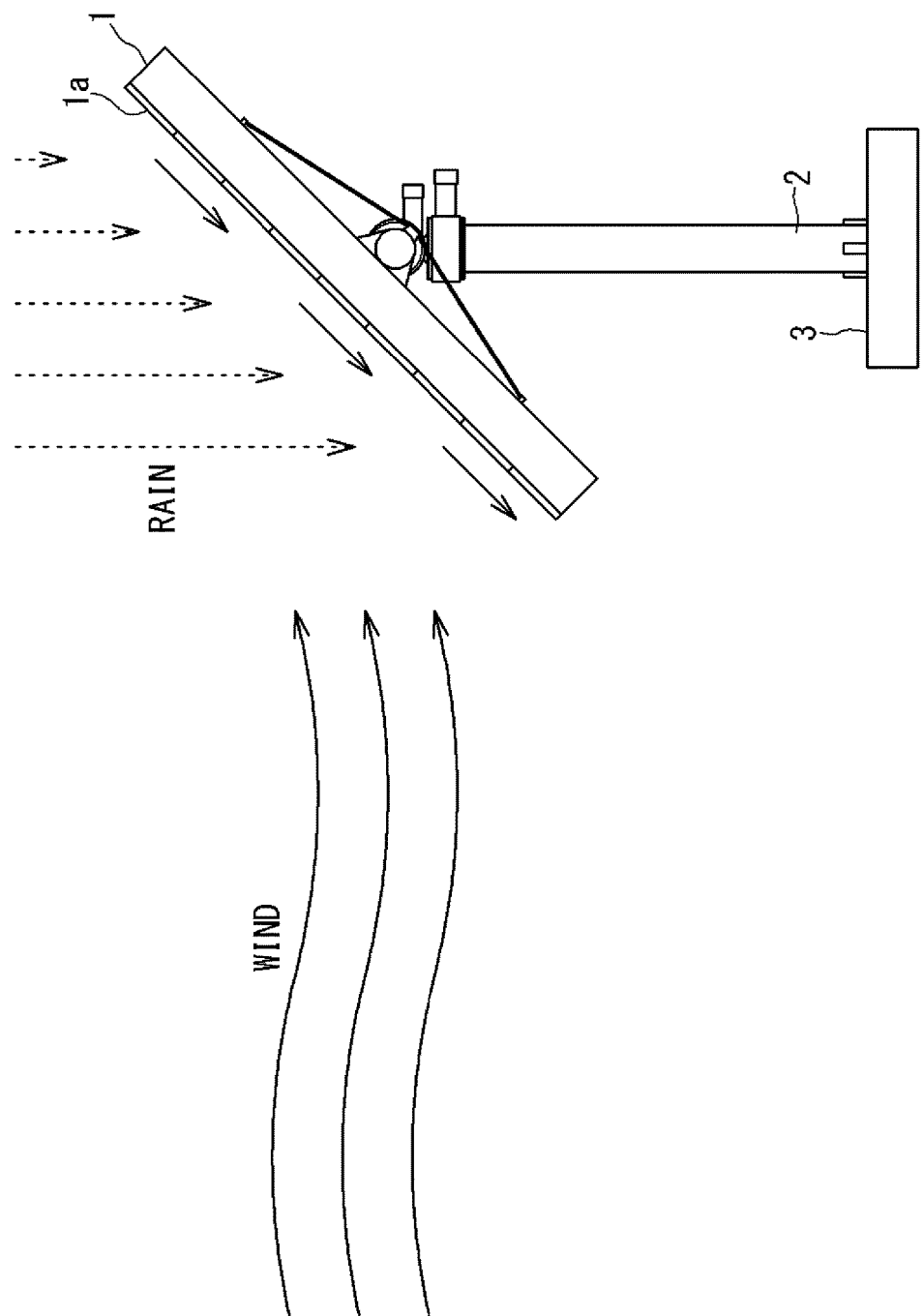
FIG. 6 shows pattern 2 of the cleaning mode which uses rain, wind, and gravity as the natural phenomena.

FIG. 6 shows pattern 2 of the cleaning mode which uses rain, wind, and gravity as the natural phenomena. In this case, the light receiving surface 1a of the photovoltaic panel 1 faces obliquely upward. In addition, the light receiving surface 1a faces not merely obliquely upward but faces an azimuth direction such that wind (side wind) obliquely hits the light receiving surface 1a. It should be noted that wind may hit the light receiving surface 1a from the direction that the light receiving surface 1a faces, but it is preferable that wind hits the light receiving surface 1a obliquely.

First, by causing the light receiving surface 1a to face obliquely upward, substance such as dust attached to the light receiving surface 1a is washed off to be dropped by the rainfall. In addition, since wind hits the light receiving surface 1a and flows along the light receiving surface 1a to provide the stirring effect caused by the water flow, it is possible to enhance the effect of washing off dust and the like attached to the light receiving surface 1a.

In this case, it is necessary for the photovoltaic panel 1 to take such an orientation at the time of rainfall. In addition, if there is wind at a predetermined wind speed, information of the direction/time in which the wind blows is required. It should be noted that the angle range of the "obliquely upward" is a range between a state where the light receiving surface 1a is horizontal while facing directly above (0 degrees), and a state where the light receiving surface 1a stands vertically (90 degrees). The closer to horizontal the light receiving surface 1a is, the greater the total amount of rain becomes. However, in such a case, the flow speed of rain is not increased so much, and thus, the effect of washing off dust and the like is reduced. Moreover, although wind easily passes, the light receiving surface 1a is less likely to receive wind pressure, and thus, the stirring effect caused by the wind is reduced. On the contrary, the closer to vertical the light receiving surface 1*a* is, the greater the flow speed of rain becomes. However, in such a case, although the effect of removing dust and the like is obtained, the total amount of rain received by the light receiving surface 1*a* is reduced. In addition, the stirring effect caused by the wind is less likely to be exhibited. It should be noted that a certain degree of the effect of removing dust and the like is attained even by rain alone, and thus, pattern 2 of the cleaning mode can be used even when there is no or weak wind.

<<Pattern 3 of Cleaning Mode>>

FIG. 7A, FIG. 7B and FIG. 7C show pattern 3 of the cleaning mode which uses dew condensation and gravity as the natural phenomena. In this case, first, during nighttime, the light receiving surface 1*a* of the photovoltaic panel 1 is horizontal while facing directly above (ordinary orientation during nighttime) as shown in FIG. 7A. In this state, if the air temperature decreases, a large amount of dew is condensed on the light receiving surface 1*a*. Since the light receiving surface 1*a* is horizontal, the condensed dew water is accumulated on the light receiving surface 1*a* due to surface tension. The accumulated condensed dew water softens the dirt stuck to the surface of the light receiving surface 1*a*, to facilitate coming off of the dirt. Next, when morning approaches, the light receiving surface 1*a* is caused to face obliquely upward as shown in FIG. 7B. Accordingly, the condensed dew water flows down together with the attached substance such as dust. When the condensed dew water has flowed down and the sun rises, the photovoltaic panel 1 is caused to enter its ordinary power generation state of tracking the sun as shown in FIG. 7C.

<<Coating of Light Receiving Surface>>

In order to further enhance the cleaning effect brought by execution of the cleaning mode 1 to 3 as described above, it is preferable to provide low friction coating that facilitates coming off of dirt such as dust from the light receiving surface 1*a*.

In the case where a super-hydrophilic coating film (for example, $SiO_2$) is formed as a coating material, the effect of washing off dirt by use of condensed dew water and rainfall is enhanced. In the case where a super water-repellent coating film (fluorine-based coating film or coating film with fine irregularities) is formed, the effect of reducing attachment of dirt can be obtained.

With such a hydrophilic or water-repellent layer, it is possible to promote removal of attached substance in the cleaning mode.

<<Photovoltaic System Including Control of Cleaning Mode>>

Next, a photovoltaic system which allows execution of control of the cleaning mode explained as an example above will be described.

Figure 8:
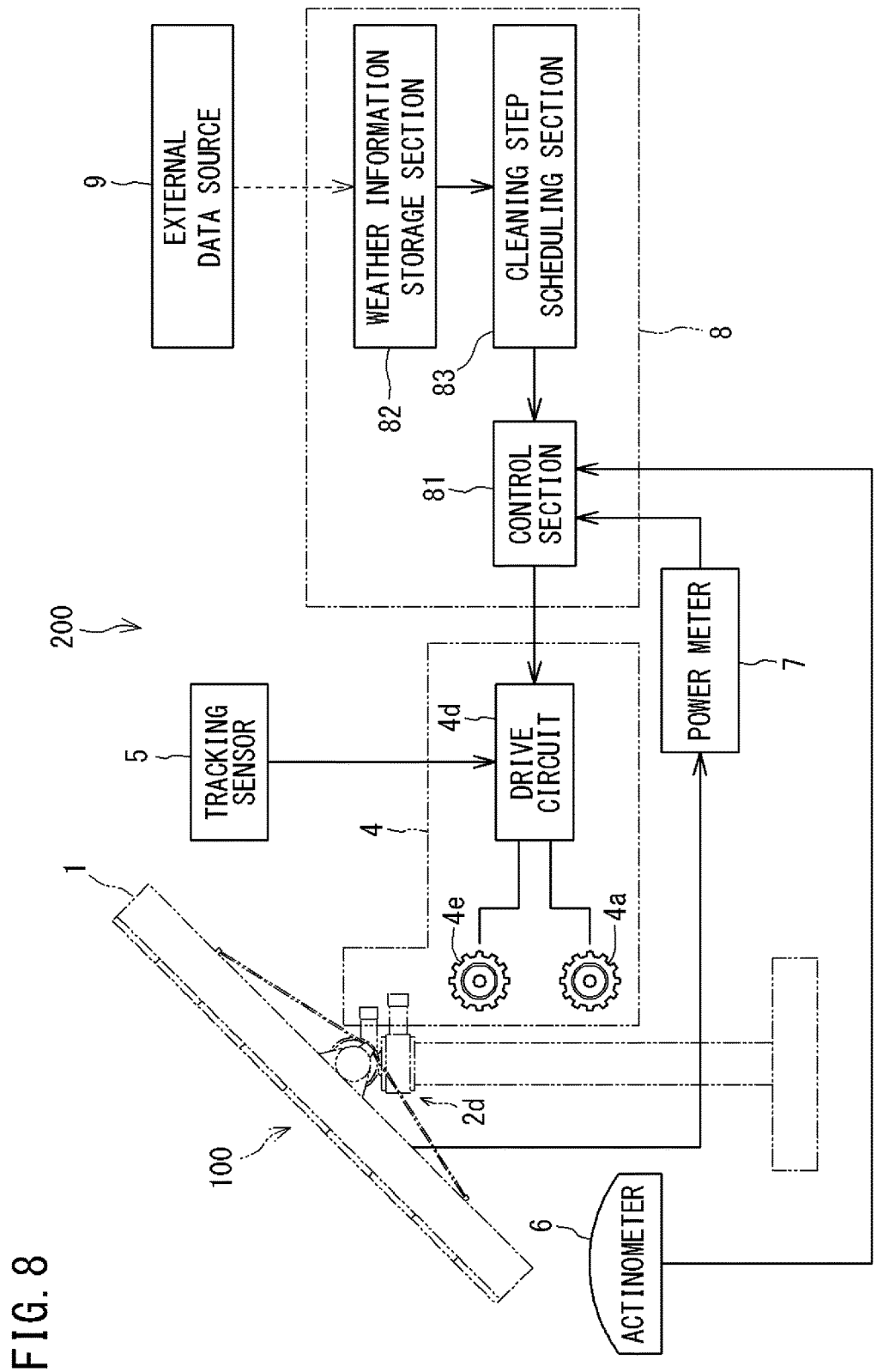
FIG. 8 shows one example of a photovoltaic system including the system part regarding orientation control of the photovoltaic apparatus of a concentrator type.

FIG. 8 shows one example of a photovoltaic system 200 including the system part regarding orientation control of the photovoltaic apparatus 100 of a concentrator type. In FIG. 8, the photovoltaic apparatus 100 of a concentrator type includes the drive device 4 for performing operation of tracking the sun as described above. The drive device 4 includes: a stepping motor 4*e* for driving in the elevation direction; a stepping motor 4*a* for driving in the azimuth direction; and a drive circuit 4*d* which drives these. These stepping motors 4*e* and 4*a* are built in the two-axis drive 2*d*.

The stepping motors are merely one example, and another power source may be employed.

The photovoltaic apparatus 100 is provided with a tracking sensor 5 and an actinometer 6 in a vacant space or the like of the photovoltaic panel 1 or in the vicinity thereof. An output signal from the actinometer 6 is inputted to a control section 81 of a control device 8. Power generated by the photovoltaic panel 1 can be detected by a power meter 7, and a signal indicating the detected power is inputted to the control section 81. The drive device 4 stores the latitude and longitude of the installation place of the photovoltaic panel 1, and also has a function of a clock. Based on an output signal from the tracking sensor 5 and the position of the sun calculated from the latitude, the longitude, and the time, the drive device 4 performs tracking operation such that the photovoltaic panel 1 always faces the sun. However, there are also cases where the tracking sensor 5 is not provided. In such a case, tracking operation is performed based on only the position of the sun calculated from the latitude, the longitude, and the time.

Usually, the control device 8 is provided away from the photovoltaic apparatus 100. In the control device 8, a weather information storage section 82 and a cleaning step scheduling section 83 exist in addition to the control section 81. The control device 8 can functionally form the sections (81 to 83) by use of a computer, a memory, an auxiliary storage device, and the like. The weather information storage section 82 is provided, from an external data source 9, with local weather information of the place where the photovoltaic apparatus 100 is installed. The control device 8 is connected to the external data source 9 via the Internet, for example. Although depending on the country or region where the external data source 9 is installed, the external data source 9 is a weather forecast data source provided by an organization of the country or a local government or a private weather information providing company, for example.

The cleaning step scheduling section 83 schedules a cleaning step based on the information stored in the weather information storage section 82. Based on the schedule of the cleaning step prepared by the cleaning step scheduling section 83, the control section 81 drives the drive device 4 to cause the photovoltaic apparatus 100 to execute the cleaning mode.

Figure 9:
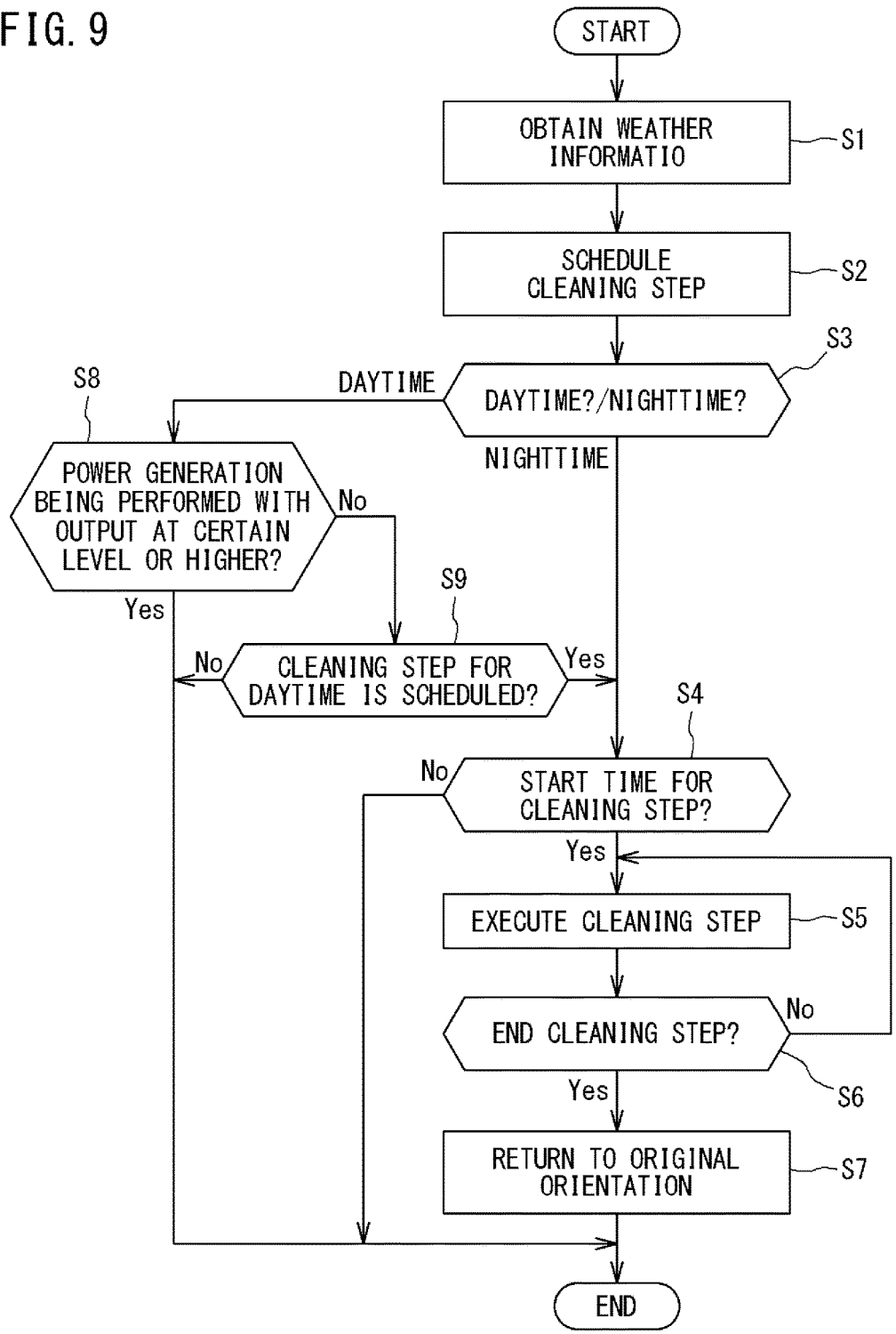
FIG. 9 is a flow chart for executing a cleaning step.

FIG. 9 is one example of a flow chart for executing the cleaning step. The process of the flow chart is periodically executed. The body that executes the flow chart is the control device 8.

First, in step S1, the control device 8 obtains the latest weather information from the external data source 9 and stores the obtained weather information in the weather information storage section 82. Next, the control device 8 schedules the cleaning step based on the obtained weather information (step S2). Generally, execution of the cleaning step is done during nighttime, but the execution can also be done during daytime in rare cases. Thus, an example of scheduling the cleaning step not only for nighttime but also for daytime will be described here.

If there is a time zone in which wind of a predetermined strength or greater is expected to blow, for example, the cleaning mode that causes the orientation of pattern 1 (FIG. 5) is planned to be executed based on the time zone and the wind direction.

In the case where rain is expected, the cleaning mode that causes the orientation of pattern 2 (FIG. 6) is planned to be executed in that time zone. Furthermore, in the case where wind of a predetermined strength or greater is also expected, the cleaning mode that causes the orientation of pattern 2 is planned to be executed, in consideration of the azimuth as well so that the wind can hit the light receiving surface 1*a* at an appropriate angle (obliquely).

In the case where neither rain nor wind having a predetermined strength is expected, the cleaning mode that causes the orientation of pattern 3 (FIG. 7A, FIG. 7B, FIG. 7C) is planned to be executed during nighttime.

Next, the control device 8 determines whether it is daytime or nighttime at present (step S3). The control device 8 can determine this by use of the built-in clock function, for example. Alternatively, the above determination can also be made by use of the generated power or the output from the actinometer 6.

If the determination result in step S3 is "daytime", the control device 8 determines whether power generation is being performed with an output at a certain level or higher (step S8). This determination result is usually "Yes", and then, the process ends. That is, in this case, the cleaning mode is not executed.

On the other hand, in the case of "nighttime" in step S3, the control device 8 determines whether it is the start time for the cleaning step (step S4). If it is not the start time yet, the control device 8 ends the process once. Then, when executing the flow chart next time, if the weather information is the same, the control device 8 reaches step S4 in the same manner. The weather information can change any time, and thus, by following the above procedure, it is possible to execute the cleaning step that is scheduled based on the latest weather information.

When it has become the start time for the cleaning step, the control device 8 executes the cleaning step (step S5) and then ends the cleaning step (step S6). Thereafter, the control device 8 returns the orientation of the photovoltaic panel 1 to its original orientation (step S7). When it is nighttime, the original orientation is a horizontal orientation where the light receiving surface 1a faces directly above. Then, the process of the flow chart ends.

In some rare cases, even during daytime, it becomes dark and power generation cannot be performed with an output at a certain level or higher ("No" in step S8). In such a case, the control device 8 determines whether the cleaning step for daytime has been scheduled (step S9). That is, this is a case where the cleaning mode of pattern 1 (FIG. 5) or pattern 2 (FIG. 6) can be executed by use of rain and/or wind. Since pattern 3 is dedicated for use during nighttime, and thus, pattern 3 cannot be the cleaning mode to be used during daytime. In the case of "No" in step S9, the process ends, and in the case of "Yes" in step S9, the process of steps S4 to S7 are executed.

<<Summary>>

As described above, the photovoltaic system of the present embodiment includes the control device 8 configured to cause, during power generation, the drive device 4 to drive the photovoltaic panel 1 such that sun light hits the photovoltaic panel 1, the control device 8 configured to, when executing the cleaning mode, control the drive device 4 such that the photovoltaic panel 1 takes an orientation that facilitates removal of attached substance to the light receiving surface 1a thereof by use of at least one of natural phenomena including rain, wind, dew condensation, and gravity.

Accordingly, when executing the cleaning mode, the control device 8 causes the drive device 4 to operate such that the photovoltaic panel 1 takes an orientation that facilitates removal of attached substance to the light receiving surface 1a thereof by use of natural phenomena. Therefore, it is possible to perform cleaning of the light receiving surface 1a by use of natural phenomena such as rain, wind, dew condensation, and gravity. Accordingly, without providing a complicated cleaning device, it is possible to provide a photovoltaic system that realizes a cleaning function in a simple manner.

Such a system is appropriate in particular for cleaning the photovoltaic panel that is installed in a country or a region where the water rate is high or in a place where cleaning with tap water cannot be performed or is difficult to be performed.

The control device 8 obtains weather information from an external information source (the external data source 9), makes a schedule of the cleaning mode, and controls the drive device 4 based on the schedule. By obtaining highly reliable weather information, the control device 8 can execute the cleaning mode systematically. In addition, it is not necessary to provide a sensor or the like for rain and wind on the photovoltaic panel side.

The present embodiment is also a panel cleaning method for the photovoltaic apparatus 100. That is, this is a panel cleaning method including, when executing the cleaning mode, controlling the drive device 4 to cause the photovoltaic panel 1 to take an orientation that facilitates removal of attached substance to the light receiving surface 1a thereof by use of at least one of natural phenomena including rain, wind, dew condensation, and gravity.

According to the cleaning method, when the cleaning mode is to be executed, the photovoltaic panel 1 takes an orientation that facilitates removal of attached substance to the light receiving surface 1a thereof by use of natural phenomena. Therefore, it is possible to perform cleaning of the light receiving surface 1a by use of natural phenomena such as rain, wind, dew condensation, and gravity, for example. Accordingly, without providing a complicated cleaning device, it is possible to provide a panel cleaning method that realizes a cleaning function in a simple manner.

<<Another Example of System Configuration>>

Figure 10:
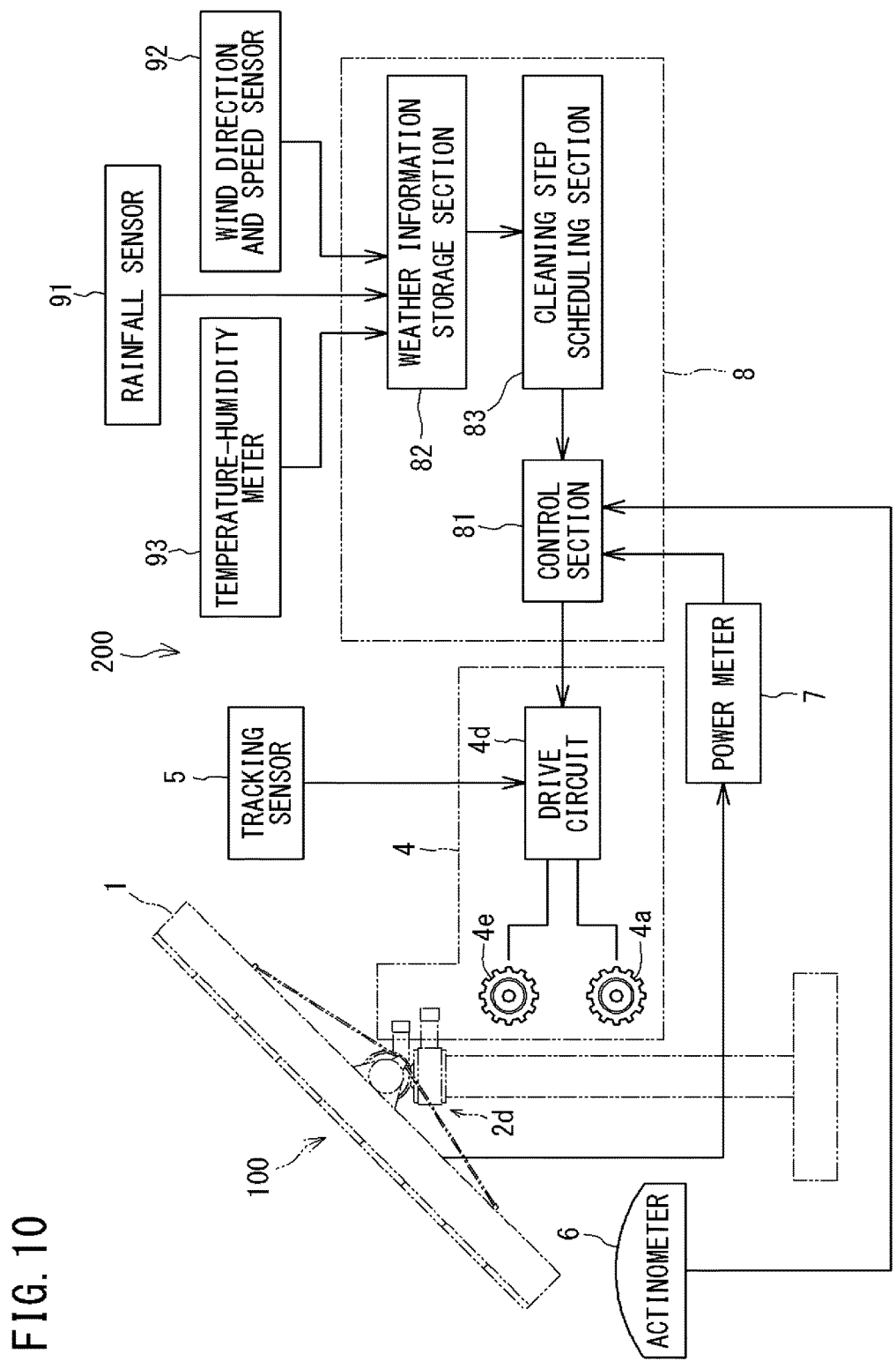
FIG. 10 shows another example of system configuration of the photovoltaic system.

FIG. 10 shows another example of system configuration of the photovoltaic system. The difference from FIG. 8 is that the information source of weather information is not an external data source but the outputs from sensors included in the photovoltaic system. The other configuration is the same as that in FIG. 8. That is, with regard to rain, a sensor output from a rainfall sensor 91 is provided to the weather information storage section 82 of the control device 8, and with regard to wind direction and the amount of wind, sensor outputs from a wind direction and speed sensor 92 are provided to the weather information storage section 82 of the control device 8. In addition, sensor outputs regarding temperature and humidity are provided from a temperature-humidity meter 93 to the weather information storage section 82 of the control device 8.

In this case, scheduling of the cleaning step cannot be performed in advance based on forecast of rain and wind. However, when a state has been realized where pattern 1 or 2 of the cleaning mode can be executed based on sensor outputs from the rainfall sensor 91 and the wind direction and speed sensor 92 (i.e., during nighttime, or in a state where sufficient power generation cannot be performed even during daytime), the control device 8 makes a schedule for executing pattern 1 or 2 of the cleaning mode immediately, and sends an instruction to the drive device 4, thereby causing the photovoltaic panel 1 to take the orientation of the cleaning mode.

Thus, cleaning of the light receiving surface 1a can be performed. When a state has been realized where neither pattern 1 nor 2 of the cleaning mode can be executed based on sensor outputs from the rainfall sensor 91 and the wind direction and speed sensor 92, the control device 8 and the drive device 4 having received that instruction return the photovoltaic panel 1 to its original orientation. In this manner, it is possible to execute the cleaning mode as appropriate in accordance with the weather condition of the site where the photovoltaic panel 1 is installed.

On the other hand, based on sensor outputs from the temperature-humidity meter 93, it is possible to forecast occurrence of dew condensation from nighttime toward early morning. Thus, when such dew condensation is forecasted, it is possible to schedule and execute pattern 3 of the cleaning mode. It should be noted that, not only in the time zone from nighttime to early morning, but also in the case where a condition is forecasted that is likely to cause dew condensation due to sudden change in air temperature and the like, it is possible to execute pattern 3 of the cleaning mode.

The configuration shown in FIG. 10 (in which the rainfall sensor 91, the wind direction and speed sensor 92, and the temperature-humidity meter 93 are provided) can be used in combination with the configuration shown in FIG. 8.

<<Others>>

In the above embodiment, photovoltaic of a concentrator type has been described. However, application of the cleaning mode described above is not limited thereto. For example, even in the case of a general photovoltaic apparatus that is not a concentrator type, if the photovoltaic apparatus is equipped with a rotating mechanism similar to that in FIG. 1, the cleaning mode using natural phenomena can be executed.

In the above embodiment, execution of the cleaning mode using only natural phenomena has been described. However, for example, a vibration device which causes the photovoltaic panel 1 to micro-vibrate may be provided while using the natural phenomena as well, and in the cleaning mode, removal of attached substance to the light receiving surface 1a may be promoted by use of the vibration. Such a vibration device can be easily obtained by, for example, slightly increasing the size of a component for realizing the vibration function as in a mobile phone or the like.

Figure 11:
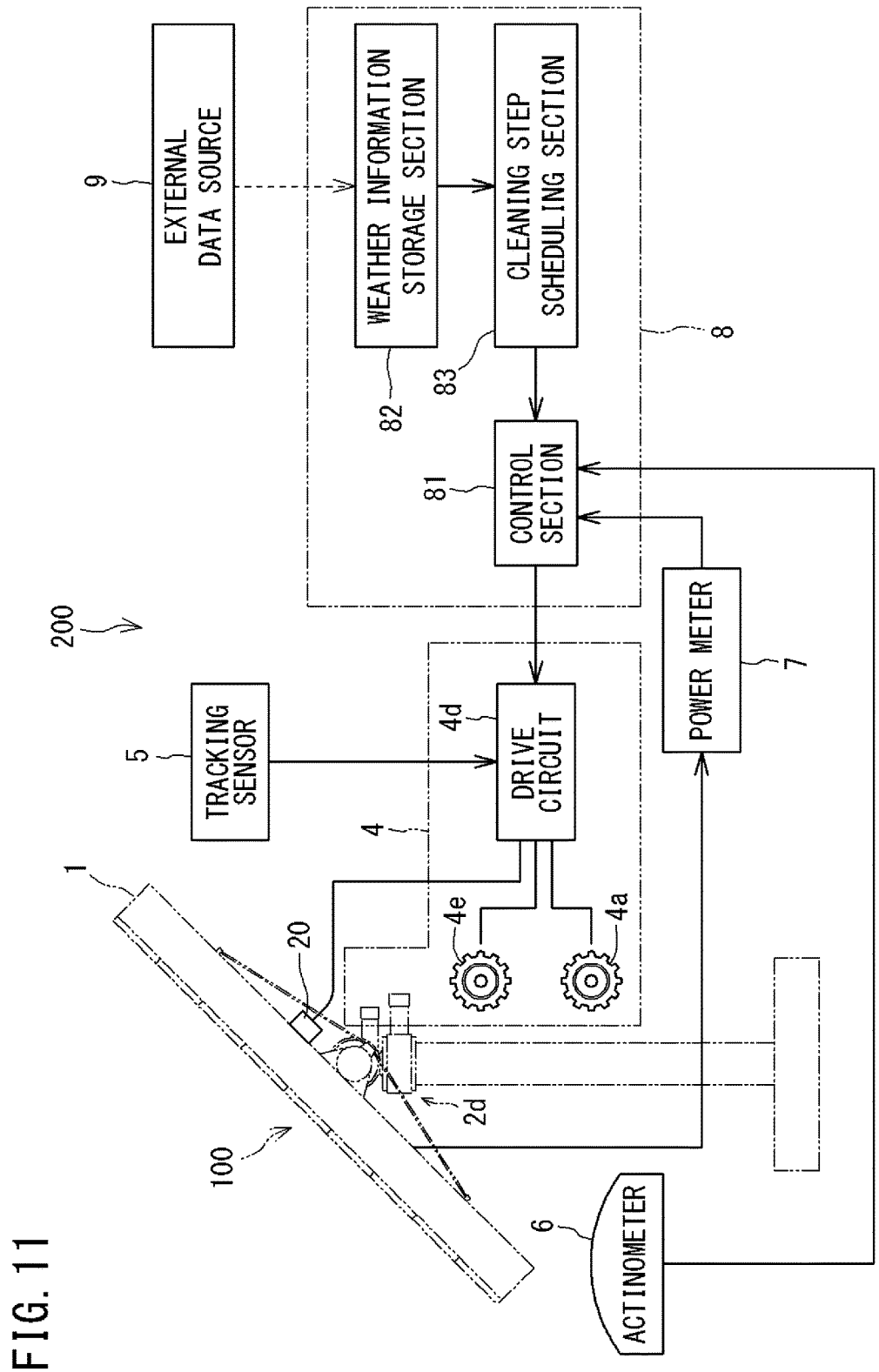
FIG. 11 shows a configuration shown in FIG. 8 to which a vibration device has been added.

FIG. 11 shows a configuration shown in FIG. 8 to which a vibration device 20 has been added.

It should be understood that the embodiments disclosed herein are merely illustrative and not restrictive in all aspects. The scope of the present invention is defined by the scope of the claims, and is intended to include meaning equivalent to the scope of the claims and all modifications within the scope.

REFERENCE SIGNS LIST 1 photovoltaic panel
1a light receiving surface
1M photovoltaic module
2 support portion
2d two-axis drive
2x axis
3 base
4 drive device
4a, 4e stepping motor
4d drive circuit
5 tracking sensor
6 actinometer
7 power meter
8 control device
9 external data source
11 housing
11a bottom surface
11b flange portion
12 flexible printed circuit
12c cell
13 concentrating portion
13f Fresnel lens
14 connector
20 vibration device
81 control section
82 weather information storage section
83 cleaning step scheduling section
91 rainfall sensor
92 wind direction and speed sensor
93 temperature-humidity meter
100 photovoltaic apparatus
200 photovoltaic system

The invention claimed is:

1. A photovoltaic system comprising:
a support portion;
a concentrator photovoltaic panel supported by the support portion so as to be able to take an orientation at any angle to 360 degrees in each of azimuth and elevation;
a drive device configured to change the orientation of the concentrator photovoltaic panel; and
a control device capable of causing, during power generation, the drive device to drive the concentrator photovoltaic panel such that sun light hits the concentrator photovoltaic panel, the control device being programmed to execute a cleaning mode as a routine work by using a time when the power generation is not executed, the control device being programmed such that:
the concentrator photovoltaic panel takes a desired orientation in each of the azimuth and the elevation, the desired orientation being selected suitable for cleaning by urging removal of substance attached to a light receiving surface of the concentrator photovoltaic panel by use of at least one of natural phenomena including rain, wind and dew condensation, along with falling by gravity, and
the concentrator photovoltaic panel keeps the orientation for a predetermined time period to urge the substance to be removed and thereafter returns to an orientation that the concentrator photovoltaic panel had before executing the cleaning mode.

2. The photovoltaic system according to claim 1, wherein the control device is capable of obtaining weather information regarding at least rain and wind from an external information source, capable of scheduling the cleaning mode, and capable of controlling the drive device based on the schedule.

3. The photovoltaic system according to claim 1, further comprising:
a rainfall sensor and a wind direction and speed sensor, wherein
the control device is capable of controlling the drive device based on sensor outputs from the rainfall sensor and the wind direction and speed sensor.

4. The photovoltaic system according to claim 1, wherein in the cleaning mode, the concentrator photovoltaic panel is capable of being oriented so that wind hits the light receiving surface which faces obliquely downward.

5. The photovoltaic system according to claim 2, wherein in the cleaning mode, the concentrator photovoltaic panel is capable of being oriented so that wind hits the light receiving surface which faces obliquely downward.

6. The photovoltaic system according to claim 3, wherein
in the cleaning mode, the concentrator photovoltaic panel is capable of being oriented so that wind hits the light receiving surface which faces obliquely downward.

7. The photovoltaic system according to claim 1, wherein
in the cleaning mode, the concentrator photovoltaic panel is capable of being oriented so that rain hit the light receiving surface which faces obliquely upward.

8. The photovoltaic system according to claim 2, wherein
in the cleaning mode, the concentrator photovoltaic panel is capable of being oriented so that rain and wind hit the light receiving surface which faces obliquely upward.

9. The photovoltaic system according to claim 3, wherein
in the cleaning mode, the concentrator photovoltaic panel is capable of being oriented so that rain and wind hit the light receiving surface which faces obliquely upward.

10. The photovoltaic system according to claim 1, wherein
in the cleaning mode, the light receiving surface is capable of being kept horizontal while facing directly above from nighttime to dawn, and then, the light receiving surface is capable of being oriented to stand, and capable of dropping condensed dew water.

11. The photovoltaic system according to claim 2, wherein
in the cleaning mode, the light receiving surface is kept horizontal while facing directly above from nighttime to dawn, and then, the light receiving surface is capable of being oriented to stand, and capable of dropping condensed dew water.

12. The photovoltaic system according to claim 3, wherein
in the cleaning mode, the light receiving surface is kept horizontal while facing directly above from nighttime to dawn, and then, the light receiving surface is capable of being oriented to stand, and capable of dropping condensed dew water.

13. The photovoltaic system according to claim 1, wherein
the light receiving surface has a hydrophilic or water-repellent layer formed thereon.

14. The photovoltaic system according to claim 1, wherein
a vibration device capable of causing the concentrator photovoltaic panel to micro-vibrate in the cleaning mode is provided.

15. A panel cleaning method for a photovoltaic apparatus, the photovoltaic apparatus including: a support portion; a concentrator photovoltaic panel supported by the support portion so as to be able to take an orientation at any angle to 360 degrees in each of azimuth and elevation; and a control device programmed to control a drive device configured to change the orientation of the concentrator photovoltaic panel, the panel cleaning method is programmed to execute a cleaning mode as a routine work when the power generation is not executed, the panel cleaning method comprising:
when executing the cleaning mode, using a time when the power generation is not executed, and the control device being programmed to cause the concentrator photovoltaic panel to take a desired orientation in each of the azimuth and the elevation, the desired orientation being selected suitable for cleaning by urging removal of substance attached to a light receiving surface of the concentrator photovoltaic panel by use of at least one of natural phenomena including rain, wind and dew condensation, along with falling by gravity,
keeping the orientation of the concentrator photovoltaic panel for a predetermined time period to urge the substance to be removed, and thereafter.
returning the concentrator photovoltaic panel to an orientation that the concentrator photovoltaic panel had before executing the cleaning mode.

* * * * *